United States Patent

Saraki

[11] Patent Number: 5,903,858
[45] Date of Patent: May 11, 1999

[54] TRANSLATION MACHINE FOR EDITING A ORIGINAL TEXT BY REWRITING THE SAME AND TRANSLATING THE REWROTE ONE

[76] Inventor: Masashi Saraki, c/o Adachi International Nagoyaseni Bldg. 9-27 Nishiki 2-chome, Naka-ku, Nagoya-shi, Aichi-ken, Japan

[21] Appl. No.: 08/672,439

[22] Filed: Jun. 28, 1996

[30] Foreign Application Priority Data

Jun. 23, 1995 [JP] Japan ..................................... 5-157686

[51] Int. Cl.⁶ .................................................. G06F 17/28
[52] U.S. Cl. ..................................... 704/4; 704/2
[58] Field of Search .................................. 704/1–3, 4–6, 704/9; 364/920.4, 975

[56] References Cited

U.S. PATENT DOCUMENTS

| | | | |
|---|---|---|---|
| 4,821,230 | 4/1989 | Kumano et al. | 704/2 |
| 5,299,124 | 3/1994 | Fukumochi et al. | 704/2 |
| 5,495,413 | 2/1996 | Kutsumi et al. | 704/4 |
| 5,644,774 | 7/1997 | Fukumochi et al. | 395/754 |

FOREIGN PATENT DOCUMENTS

| | | | |
|---|---|---|---|
| 04-114275 | 4/1992 | Japan | G06F 15/38 |
| 5-197751 | 8/1993 | Japan | G06F 15/38 |

*Primary Examiner*—David R. Hudspeth
*Assistant Examiner*—Patrick N. Edouard

[57] ABSTRACT

To provide a translation machine for translating the original text, while retaining the relationship information by extracting the relationship information from the original text and editing the text based on the information. At the relationship information extraction and text edition process, the relationship information is extracted, and based on the relationship information paragraphs, sentences and phrases are edited. The text is rewritten based on the rewriting rule of a session layer. Through this process, the original text is rewritten or edited to a simple text but provided with the equivalent information. Subsequently, sentence structure analysis, semantic analysis and sentence synthesis are executed, thereby outputting translated sentences.

3 Claims, 7 Drawing Sheets

FIG.1A  PRIOR ART

S: SENTENCE
NP: NOUN PHRASE
VP: VERBAL PHRASE
ADP: ADVERBIAL PHRASE
PP: PREPOSITIONAL PHRASE
AJ: ADJECTIVE
IA: DEFINITE ARTICLE
CON: CONJUNCTION
N: NOUN
V: VERB
AD: ADVERB
P: PREPOSITION
DA: DEMONSTRATIVE ADJECTIVE

○ *First of all;*
Paragraph 1

○ *Further;*
Paragraph 6

Paragraph 2

Paragraph 7

○ *Secondly;*
Paragraph 3

○ *Finally;*
Paragraph 8

Paragraph 4

Paragraph 9

○ *Thirdly;*
Paragraph 5

○ *In summary;*
Paragraph 10

TRANSLATION MACHINE FOR EDITING A ORIGINAL TEXT BY REWRITING THE SAME AND TRANSLATING THE REWROTE ONE

FIELD OF THE INVENTION

This invention relates to a translation machine and a method of machine translation, in which the text written in a source language is inputted and converted to a desired target language, and then the translated sentences are outputted to the external devices therefrom.

BACKGROUND OF THE INVENTION

Conventionally, in a machine translation system, the original text to be translated is analyzed sentence by sentence by the analyzers thereof. Analysis steps thereby such as morphological analysis, syntax analysis(parsing) and semantic analysis are executed sequentially. To start with, a sentence is parsed through the morphological analysis, followed by the syntax analysis how the parsed words are related and arranged grammatically. At the step of syntax analysis, for example, using a top-down vertical search algorithms, the sentence is analyzed according to Context Free Grammar, and branched into a roots, nodes and leaves, until the termination is reached which is minimum unit for parsing. In the final analysis, tree structure is derived as a whole. Through the semantic analysis, for example by referring and collating a noun having attributes in semantics which are described in dictionaries in the machine translation system, the meaning of the subject is determined, and yet by referring and collating the information regarding sentence structures able to be formed by a detected predicate, the semantic attribute and structure of the subject are determined.

Such a parsing algorithm is implemented as the parsing rule based on the aforementioned analysis tree structure. In the tree structure, individual sentences are related with one another only vertically according to the text, and individual morphemes are related with one another only vertically within the sentence. All of the relationship among these elements must be reduced into only positions in a hierarchy. No relations other than the vertical relation are extracted from the tree structure. For the information regarding the relationship among words and phrases in the sentence, only the relationship able to be extracted as information is the relation that a conjunction positioned at a node indicates the anaphoric relationship together with the previous or subsequent clause or the position relation among adverbs and adjectives in phrase structure.

The text is a unity of syntax and meaning, and a stream of sentences and words. From the viewpoint of the information theory, the text is a randomly variable and continuous information source. Nevertheless, the text is parsed into discrete and unrelated symbols in the aforementioned analysis algorithm, and thus the relationship in the text is outputted as fragmented information called strings of the symbols. The analysis algorithm means information processing for handling the text as a discrete information source. Even if strings mentioned above correspond to the markov information source of Markov process, the information is discrete. Therefore, the relationship information will be lost.

As mentioned above, no relationship within a text can be analyzed through the syntax analysis using the tree structure in the conventional machine translation system, and then no relationship information in semantics and syntax is available. In the conventional machine translation system, the context and the syntax are analyzed insufficiently, which decreases the precision of the translation.

For example, when an English sentence is analyzed in the conventional machine translation system, either the information regarding the connection among clauses or the information regarding correlative and subordinate conjunctions cannot be analyzed or extracted. The correlative conjunctions are used in pairs and define the structure and meaning of the connection. The correlative information is provided by a correlative pair of the precedent adverb and the correlative conjunction, e.g., such . . . that, so . . . that, so . . . as or other, and by a pair of subordinating conjunctions, e.g., partly because . . . , partly because. Such correlative information cannot be analyzed through the conventional morpheme analysis or through the syntax analysis. In the conventional machine translation system, the sentence structure including the correlative words fails to be analyzed.

Through the analysis using the tree structure, it cannot be interpreted that even the same word provides different information according to its position or priority in word order in a sentence. There is a difference in connotation between the word "however" positioned at the beginning of the sentence and that positioned immediately after the subject of the sentence. The adverb "however" positioned immediately after the subject indicates that the content of the sentence forms a contrast to the content of the previous sentence. Such correlative information, word position information or other relationship information cannot be extracted from the original sentence or reflected in the translated sentence in the conventional machine translation system.

Figure 1A:
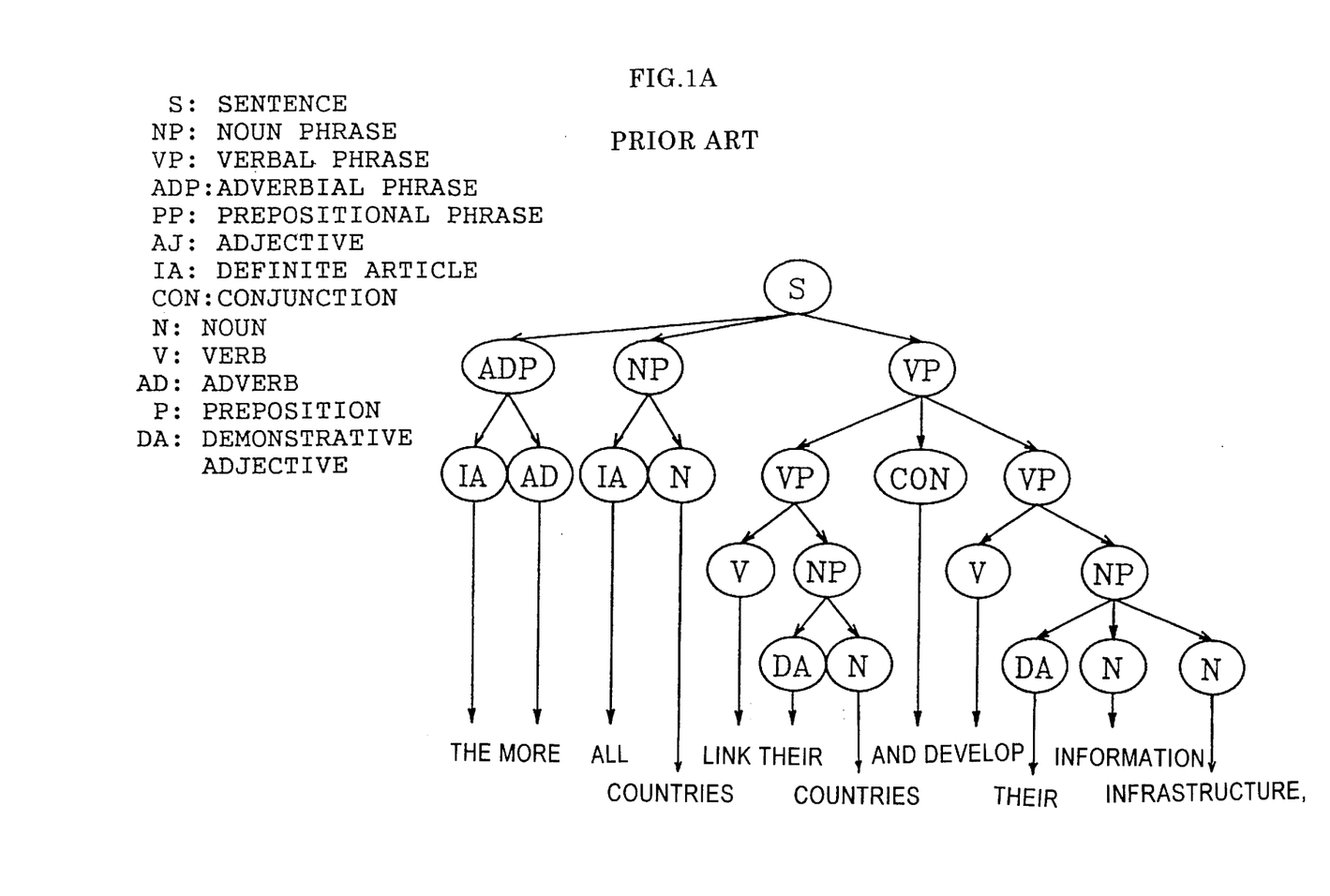
FIGS. 1A and 1B are explanatory views of a parsing tree in a conventional machine translation system.
Figure 1B:
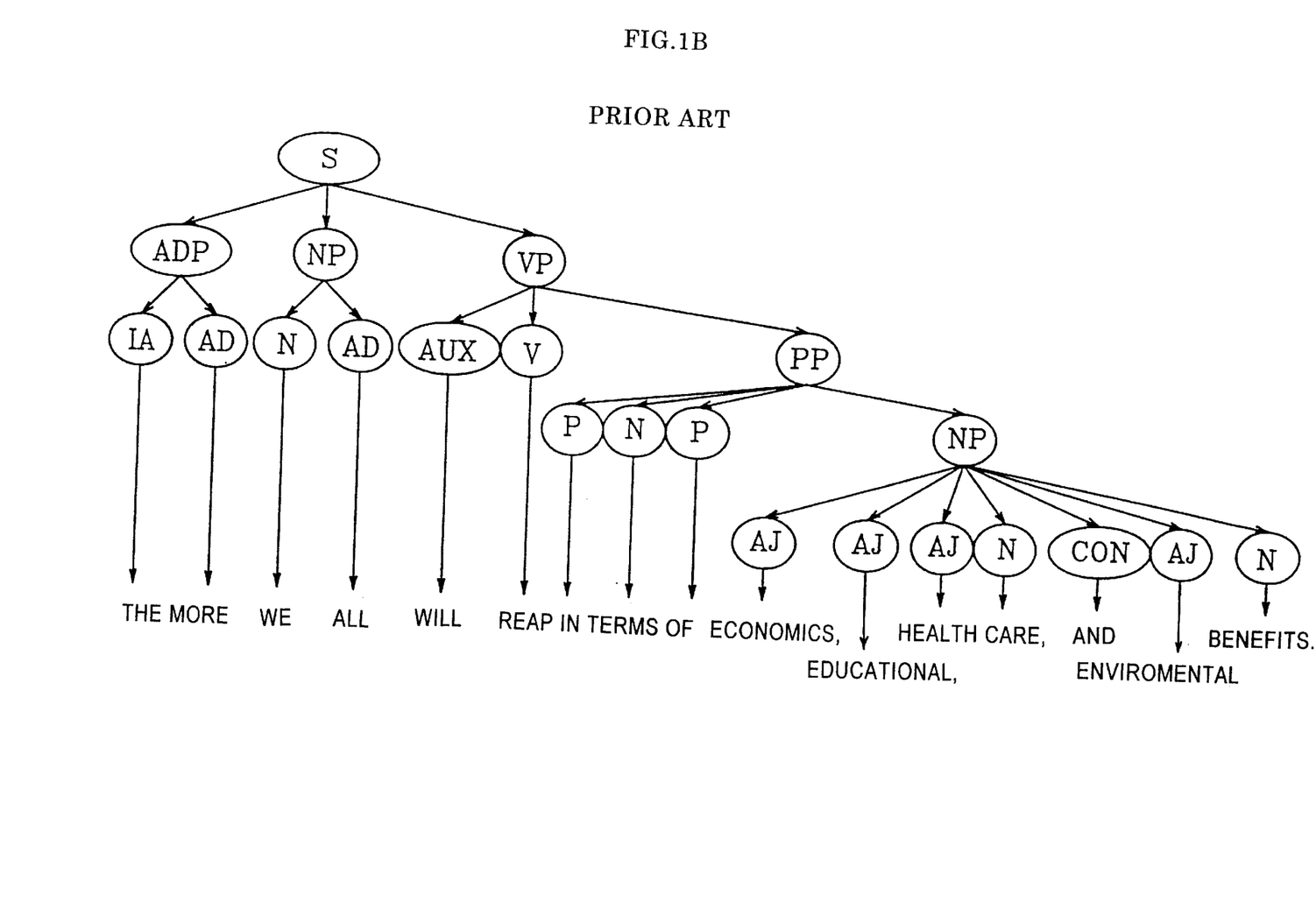

The shortcomings in the conventional machine translation system are now explained referring to the parsing tree of a sentence shown in FIGS. 1A and 1B. The parsing tree is composed of an dependent clause and a main clause. In FIGS. 1A and 1B, S denotes a sentence, ADP denotes an adverbial phrase, AD denotes an adverb, NP denotes a noun phrase, N denotes a noun, VP denotes a verbal phrase, V denotes a verb, PP denotes a prepositional phrase, P denotes a preposition, IA denotes a definite article, DA denotes a demonstrative adjective, CON denotes a conjunction, AJ denotes an adjective, and AUX denotes an auxiliary verb. When the sentence "The more all countries link their networks and develop their information infrastructure, the more we all will reap in terms of economic, educational, health care, and environmental benefits." is analyzed using the tree structure as shown in FIGS. 1A and 1B the sentence is parsed into two clauses at a node of the first comma. Subsequently, each clause is divided in phrases and the phrases are branched into individual discrete morphemes. In the process, the relevance information between the clause starting with "The more" and the clause starting with "the more" is lost. Although the repetition of the comparative means the concurrence and synergistic effect of two affairs or situations, such meaning of the clauses is also lost. The meaning and syntax represented by the indivisible clauses in the sentence are lost from the original sentence. For example, the sentence shown in FIGS. 1A and 1B is translated or transformed through the conventional machine translation system into "All countries more link their networks and develop their information infrastructure, and we all will reap more in terms of economic, educational, health care, and environmental benefits." In the translated sentence, no information regarding the correlation between the former clause and the latter clause is represented. The translated sentence does not indicate that the development of the condition mentioned in the former clause increases the result mentioned in the latter clause. Although in the sentence resulting from the conventional machine translation system, "The" positioned at the beginning of the dependent clause and "the" positioned at the beginning of the main clause are analyzed as definite articles, the former "The" is actually a relative adverb meaning "by how much" and the latter "the" is actually a demonstrative adverb meaning "by so much". Such mistake in analysis is made because no correlation information can be extracted.

Also in the conventional machine translation system, by semantically analyzing the deep structure of a sentence, the relations of the individual words or morphemes within the sentence are analyzed. For example, the government-binding theory for analyzing the relationship, the text grammar for analyzing anaphora and cataphora and the like are proposed. The syntax analysis algorithm for complementing the tree structure analysis is also proposed for use in various machine translation systems. For example, a bottom-up method, a bi-directional method, LR method, LL method, Tomita method and other are proposed.

Since in the aforementioned parsing algorithms, the sentence is analyzed as the tree structure, the information on the original text can only be partially extracted. Although the words forming a sentence have organic relations in the sentence, the abstract meaning is synthesized from the universal grammar through the semantic synthesis in the deep structure, irrelevant of the concrete semantic relevance in the original text. The word "organic" in this specification means that parts of a text work are in collaboration and in coordination with each other just as biotic organs.

It is suggested that to mechanically process the natural language it must be considered that the syntax itself has its own meaning, in other words, expression with language is the unity of syntax and meaning. It is described in the paper of Information Processing Society of Japan titled "the Speaker's Cognition in Expression with Language and Multi-step Translation Method" authored by Messrs. Ikehara, Miyazaki, Shirai and Hayashi, Volume 28, No.12 published in December, 1987, that it is difficult to prevent the meaning from being lost in the element synthesis method in which the entire meaning is synthesized from the partial meaning without considering the meaning of the syntax. Also, it is described in the book titled "Computational Linguistics: An Introduction" authored by Ralph Grishman, published by Cambridge University Press in 1986 "Yet the information conveyed by a text is clearly more than the sum of its parts—more than meanings of its individual sentences" (Chapter 4).

Furthermore, in the conventional machine translation system using the aforementioned analysis methods, since the depth of analysis and the number of backtrackings are excessively increased, the speed of syntax analysis is decreased. The calculation time is exponentially increased relative to the length of the sentence. Although the calculation time is extended, no relationship information can be extracted and no analysis precision can be disadvantageously enhanced.

Specifically, the English description of the specification of patent applications have long and complicated sentences and cannot be syntax-analyzed in the conventional machine translation system. In preparation for machine translation, the sentences need to be manually edited by dividing and rewriting the sentences such that they are adapted for the machine translation. The text must be divided and edited to a level such that the syntax analysis through the machine translation system is feasible. Much labor and time are required for such preparation works, thereby inhibiting the smooth, quick and mass translation work. Recently, even the preparation work was mechanized in the machine translation system. However, in the mechanical preparation work, the relationship information of the original text can be only insufficiently extracted, which decreases the translation precision.

SUMMARY OF THE INVENTION

Wherefore, an object of the present invention is to provide a translation machine and a method of machine translation in which the relationship information of the original text is extracted, and the original text is edited based on the extracted relationship information such that machine translation work is executed while retaining the relationship information of the original text.

To attain this or other object, the present invention provides a translation machine for converting an inputted original text into a target language and outputting translated sentences. The translation machine is provided with a model memory composed of a context module, a syntax module and a word priority module for storing a relationship information model typically representing the organic structure of the original text. The translation machine is also provided with a context information extraction means for reading the context module of the relationship information model from the model memory, collating the context module with the original text, thereby extracting a context information corresponding to a text mark described in the context module from the text. The translation machine is further provided with a link information extraction means, a word priority information extraction means, a rewriting rule memory and a text edition means. In the link information extraction means, by reading the syntax module of the relationship information model from the model memory and collating the syntax module with the original text, a link information corresponding to a discourse marker described in the syntax module is extracted from the text. In the word priority extraction means, by reading the word priority module of the relationship information model from the model memory and collating the word priority module with the original text, a word priority information corresponding to a word priority mark described in the word priority module is extracted from the text. The rewriting rule memory stores a rule of rewriting sentences and words based on the context module, the syntax module and the word priority module of the relationship information model. In the text edition means, the original text is edited by rewriting the original text according to the rule stored in the rewriting rule memory corresponding to the context information extracted by the context information extraction means, the link information extracted by the link information extraction means and the word priority information extracted by the word priority information extraction means.

In the present invention, by reading the syntax module of the relationship information model from the model memory and collating with the original text, the link information extraction means detects a conjunctive corresponding to the link mark described in the syntax module, from a sentence in the original text. Subsequently, the text edition means edits the sentence based on the rule stored in the rewriting rule memory, by deleting the detected conjunctive from the sentence, dividing the sentence into a preceding sentence and a subsequent sentence, and adding a word for semantically relating these two sentences to the subsequent sentence.

Also in the present invention, by reading the syntax module of the relationship information model from the model memory and collating with the original text, the link information extraction means detects a conjunctive corresponding to the link mark described in the syntax module, from a sentence in the original text. Subsequently, the text edition means edits the sentence based on the rule stored in the rewriting rule memory, corresponding to the degree of the connection of the conjunctive.

The present invention provides a method of machine translation. In the method, after a conjunctive is detected from a sentence of an original text, the original text is edited by deleting the detected conjunctive from the sentence, dividing the sentence into a preceding sentence and a subsequent sentence, and adding to the subsequent sentence a word for semantically relating these two sentences. According to a describing sequence of the edited text, the edited text is converted into a target language, and translated sentences are outputted.

In the aforementioned device of the present invention, the relationship information model typically representing the organic structure of the original text is stored in the model memory. The relationship information model is provided with the context module, the syntax module and the word priority module. When the context module of the relationship information model is read from the model memory and collated with the original text by the context information extraction means, the context information corresponding to the text mark described in the context module is extracted from the text. Subsequently, when the syntax module of the relationship information model is read from the model memory and collated with the text by the link information extraction means, the link information corresponding to the link mark described in the syntax module is extracted from the text. When the word priority module of the relationship information model is read from the model memory and collated with the text by the word priority information extraction means, the word priority information corresponding to the word priority mark described in the word priority module is extracted from the text. The text is edited by the text edition means by rewriting the text according to the rule stored in the rewriting rule memory corresponding to the relationship information composed of the context information extracted by the context information extraction means, the link information extracted by the link information extraction means and the word priority information extracted by the word priority information extraction means.

The link information extraction means detects the conjunctive corresponding to the link mark described in the syntax module in the sentence of the original text by reading the syntax module of the relationship information model from the model memory and collating the syntax module with the original text. Subsequently, the text edition means deletes the detected conjunctive from the sentence of the text, divides the sentence into the preceding sentence and the subsequent sentence, and adds to the subsequent sentence the word for semantically relating these two sentences.

Also, after the link information extraction means detects the conjunctive corresponding to the link mark described in the syntax module from the sentence of the original text by reading the syntax module of the relationship information model from the model memory and collating the syntax module with the original text, the text edition means edits the sentence based on the rule stored in the rewriting rule memory corresponding to the degree of the connection of the conjunctive.

As aforementioned, in the machine translation system using the parsing tree algorithm, no relationship information can be extracted in principle from the original text. The text is an organic unity of syntax and meaning. In the text, sentences, clauses and phrases are related to one another. In the parsing tree, the individual words are handled as separated symbols or quantization data. To process the text as the discrete information, the relationship information needs to be extracted from the text beforehand.

In the translation machine of the present invention, instead of providing an improved syntax analysis component using the tree structure, the relationship information model is stored as the relationship information including context, syntax and word priority information. In addition, the context information extraction means, the link information extraction means and the word priority information extraction means are provided for extracting the context information, the syntax information and the word priority information, respectively, corresponding to the relationship information model, as the relationship information. Furthermore, the text edition means is provided for editing the context, syntax and word priority of the original text by rewriting sentences and words according to the rewriting rule corresponding to the extracted relationship information.

Since the text is edited by the text edition means, for example, the sentences, clauses and phrases of the text are simplified and converted to the sentences, clauses and phrases including no context information or syntax information. The edited sentences and clauses are semantically related to one another based on the relationship information. Specifically, the sentences or clauses are related or linked by means of the information of the relationship between the preceding sentence or clause and the subsequent sentence or clause, for example, represented by an anaphora such as a pronoun or a demonstrative which indicates an antecedent concretely, or by an appropriate conjunctive. In other words, the text is reduced to the simplified sentence structure in which the parsing algorithm based on the tree structure is applicable, and the relationship can be extracted and preserved in the form of given expression mentioned above. Thus, it is possible that the edited sentences are analyzed using the conventional parsing algorithm while the relationship information is stored.

The relationship information model is constructed of the features of the text to be translated, and based on the context information, syntax information and word priority information extracted through a heuristic technique from the text. The text is analyzed and edited based on the constructed relationship information model and the translation results are outputted. The outputs are observed, the observation results are fed back, the relationship information model is edited again, and an optimum model is thus constructed. In the construction of the natural language text, it is premised that there should be a tendency in format, structure and expression of the text to be translated. Therefore, in principle there exists no universal model. The concept "information model" is constructed by extracting similar things from an object oriented real world, generalizing the things to form objects, and systematizing the objects. The information model of the present invention is defined as the formal text structure prepared by identifying, dividing and extracting the relationship exists in the text to be translated, generalizing the extracted relationship and organizing an information structure.

The relationship information is shown in denotation or connotation of a text, sentences, and words and phrases. In other words, the text is the hierarchical and organic unity unifying syntax and semantic relationship and thus the information structure model can be constructed by extracting the syntax=semantic structure information from the text and classifying the information hierarchically. By constructing the relationship information model of the natural language text, the original information of the text can be fully extracted and retained. The text to be translated is edited, while the relationship information is retained. The range in which the tree structure analysis can be applied is limited, and the syntax is analyzed. By incorporating the relationship information, the translated sentences equivalent to the original text can be prepared.

In the relationship information model, the context information is described in the context module, the syntax information relating to the sentence structure and arrangement is described in the syntax module, and the word priority information relating to the word arrangement is described in the word priority module. An example of the inner structure of the relationship information model of English sentences is now detailed.

I Context Module
 (1) Word data table clarifying a paragraph structure
 (2) Word data table clarifying the comparison with the previous paragraph or sentence II Syntax Module (clause connection and connection degree mark data)
 A Limiting relative pronoun clause (adverbial clause)
 B Participial construction
 C Correlative pair
 D That-clause construction
 E Continuous relative pronoun clause (adverbial clause)

III Priority Module
 A Data table of adverbs or adverbial clauses at the beginning of the sentence
 B Data table regarding the word priority in the adverb arrangement
 C Data table regarding the word priority in the adjective arrangement The reason for composing the syntax module of the clause connection and the connection degree mark is now explained. In the English sentence structure, simple sentences are linked or connected via the conjunctive. When the sentence is divided at the conjunctive, the connection information of the conjunctive must be retained in the translated sentence. It is described in the aforementioned book authored by Ralph Grishman that "Another circumstance arises in natural language systems which are sophisticated enough to realize that syntactic and semantic restrictions are rarely all-or-nothing affairs, and that some restrictions are stronger than others." Thus, it is required that the syntactic= semantic structure information is extracted which is concerning the connection work in the English sentences. Further, it is necessary that the original text is edited according to the intensity of the clause connection by means of the conjunctive.

In the machine translation method of the present invention, first the conjunctive is detected from the sentence of the original text. Subsequently, the conjunctive is deleted from the sentence, the sentence is divided into the preceding sentence and the subsequent sentence, and the word for semantically relating these two sentences is added to the subsequent sentence. Thus edited original text is converted to the target language according to the description sequence of the text, and the translated sentences are outputted.

An example of the algorithm of the rule of rewriting English sentences described based on the relationship information model is now explained. First, the conjunctive with a connection function is detected, and the link information of the conjunctive is extracted. Subsequently, the conjunctive is deleted from the original text. The original sentence is divided into the preceding sentence A and the subsequent sentence B. The word for semantically relating the sentences A and B, for example, a conjunctive adverb is added to the beginning of sentence B. This processing steps are represented in a general formula: Clause A $conj Clause B.→Sentence A. $Adv. Sentence B., in which $conj is a conjunction and $Adv is a connecting adverb. By editing the original text, the link information of the original text can be retained in the parsing tree and reflected in the translated sentences. The sentences are sequentially translated: after sentence A is translated, sentence B is translated. Refer to "Text Processing according to Degrees Represented by Conjunctives of Subordinate Clauses" authored by Masashi Saraki in the report of the second national conference held by the Association for Natural Language Processing of Japan in 1996.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 2:
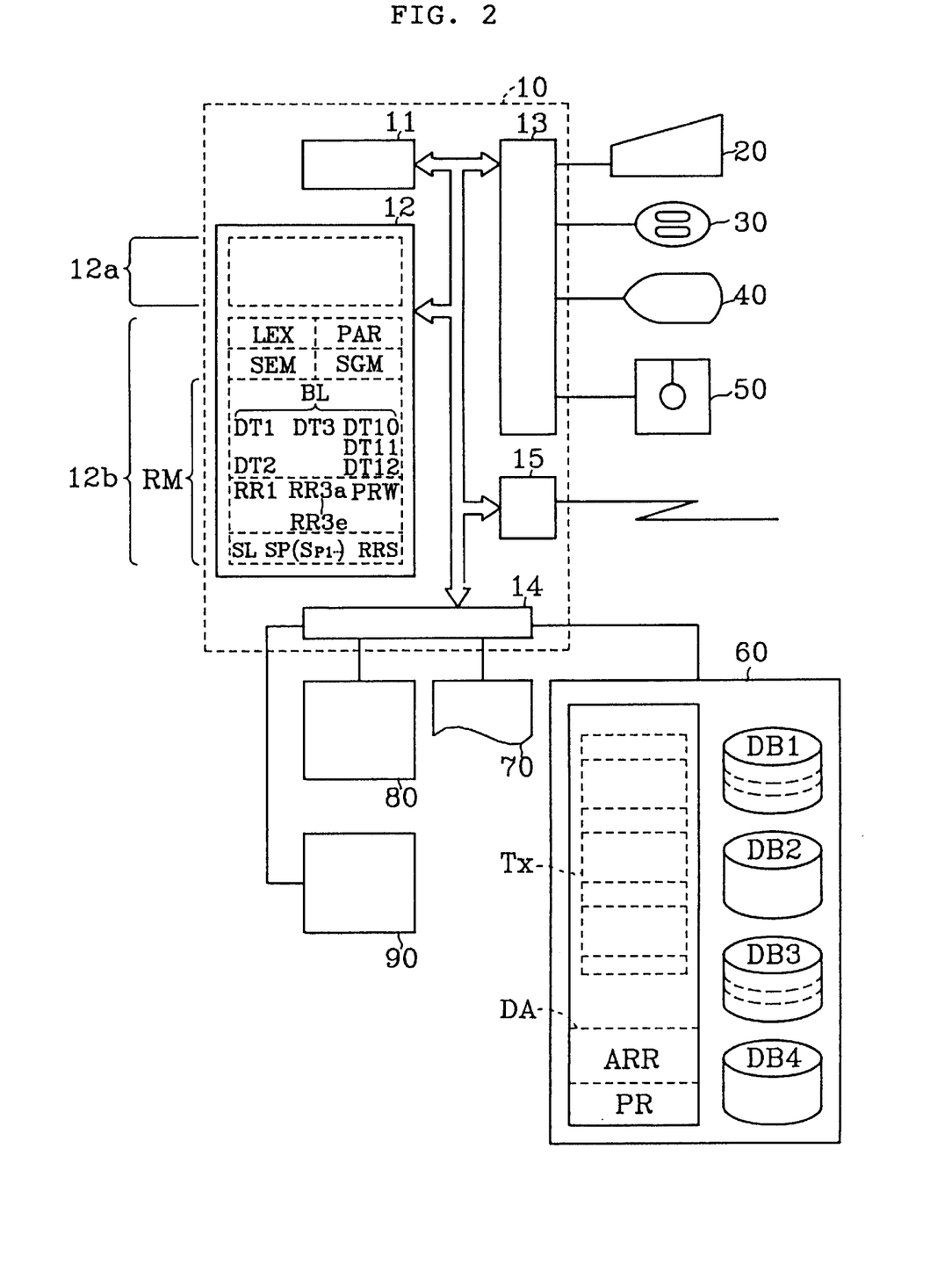
FIG. 2 is a block diagram of a machine translation system embodying the invention.

As shown in FIG. 2, a machine translation system is provided with an information processor 10, a keyboard 20, a mouse 30, a CRT display 40, a flexible disc device or FD device 50, a metal disc device or HD device 60, a printer 70, a CD-ROM reading device or CD device 80 and an optical disc device 90.

The information processor 10 is mainly provided with a logical operation circuit or central computation component 11, a memory 12, an internal interface 13, an external interface 14 and a communication interface 15 for transmitting and receiving data to and from a not-shown external device. The memory 12 is provided with a work memory 12a and a data ROM 12b. The keyboard 20, the mouse 30, the CRT display 40 and the FD device 50 are disconnectably connected to the internal interface 13. The HD device 60, the printer 70, the CD device 80 and the photomagnetic disc device 90 are disconnectably connected to the external interface 14.

When started, the information processor 10 allocates an operation area to the work memory 12a of memory 12, and transmits a not-shown menu to the CRT display 40, such that an operator can select dictionary and translation conditions from the menu on the CRT display 40. On the menu, optional languages to be translated such as English, Germany, French and Spanish are listed. The memory 12 is provided with the data ROM 12b composed of a writable, read-only memory or EEPROM. A relationship model RM, a lexical analysis module LEX, a syntax analysis module(parser) PAR, a semantic analysis module SEM, and a sentence synthesis module SGM, described later, are stored in the data ROM 12b.

A data base containing English Japanese dictionary DB1, a technical term dictionary DB2, a user dictionary DB3 and a normal expression dictionary DB4 is stored in the HD device 60. Also, a text area TX for storing English text data read from the HD device 60 and a data bank area DA for storing serial numbers are allocated in the HD device 60. Not-shown patent publication CD-ROM issued by the U.S. Patent and Trademarks Office is set in the CD device 80. This CD-ROM also contains a key index file for storing a searching keyword and a text file for recording patent specifications and other technical information. A photomagnetic disc cartridge is detachably attached to the photomagnetic disc device 90, for storing searched publications and translated sentences.

The lexical analysis module LEX stored in the data ROM 12b is composed of a rule for identifying or parsing individual words from the inputted text data and an attribute data of the parsed words. The serial numbers in the text of the parsed words and their attributes (the word is an alphabet, number, comma, bracket, hyphen or other) are stored in the work memory 12a.

In the syntax analysis module PAR the sentence structure is analyzed by comparing or collating the arrangement of the words with predetermined rules for parsing. For example, English sentence pattern is described in a Backus-Naur form or other metalanguage. The sentence structure is analyzed according to a not-shown driver routine for analyzing the syntax based on the analysis tree formed with the predetermined parsing algorithm.

In the semantic analysis module SEM, the translation rule based on, for example, Montague grammar is described. The sentence is semantically analyzed according to the analysis tree transmitted from the syntax analysis module PAR. In the sentence synthesis module SGM, described later, the Japanese sentence is prepared from the analysis tree transmitted from the syntax analysis module PAR and the Japanese translation of the individual English words resulting from the semantic analysis module SEM. The lexical analysis module LEX, the syntax analysis module PAR and the semantic analysis module SEM, which are known English analysis module, are not detailed herein.

The relationship model RM typically represents the context, syntax and word priority of the original text and is composed of a base layer BL and a session layer SL. The base layer BL is provided with a context module CM, a syntax module SM and a word priority module WM, which are described in Backus-Naur form or other metalanguage and are composed of a rule component and an action component. The relationship model RM is stored in a data table form in the data ROM 12b. A plurality of the session layers SL are disconnectably connected to the base layer BL and are specially prepared corresponding to the text to be translated. The relationship model RM is, for example, based on the understanding that the syntax of English sentences is featured by the connection structure. English sentences, clauses and phrases are logically and sequentially connected via conjunctions, correlative adverbs and other, while the Japanese equivalents are in a nested structure.

The context module CM, syntax module SM and word priority module WM of base layer BL are now explained.

I Context Module CM (1) First text mark data table DT1 clearly indicating the context containing the following:

firstly, secondly, thirdly, . . . , finally, etc.;
first of all, beginning with, starting with, etc.; and
in summary, summarizing, etc.

In the rule component, the followings are described:

Sentence: an adverbial phrase at the beginning of a paragraph, a subject;

The adverbial phrase at the beginning of a paragraph: adverbs, adverbial phrases;

Adverbs: firstly, secondly, thirdly, . . . finally, etc.;

Adverb phrases: first of all, beginning with, etc.; and

Subject: noun phrases, pronouns, gerunds.

The adverbial phrase at the beginning of the paragraph means the adverb or prepositional phrase positioned at the beginning of the first sentence of the paragraph.

The rule for rewriting will be explained hereinafter as an example of rules which are described in the action component of context module CM: "substitute a semicolon for the comma immediately after the discourse marker", "put two line space marks between the discourse marker and the previous sentence", and "add a paragraph identification symbol at the beginning of the sentence".

The paragraph structure is clarified as aforementioned, and the discourse marker is extracted and retained as the paragraph information indicating the context.

(2) Second discourse marker data table DT2 clearly indicating the contrast with the previous paragraph or sentence containing the adverbs or adverbial phrases at the beginning of the first sentence of the paragraph such as besides, moreover, however, nevertheless, so, therefore, still and yet.

The following semantic divisions are described in the rule component:

addition to the previous paragraph: beside, etc.;

negation of the previous paragraph: instead, nevertheless, all the same, however, etc.; and contrast to the previous paragraph: however, etc.

A rewriting rule RR1 for independently parsing a new sentence is indicated, for example, in a formula: <$Adv, sentence>→<$Adv;CR Sentence.>, in which the former is the original sentence, the latter is the edited sentence and CR denotes a line space mark.

Secondly, the information structure of syntax module SM is now explained.

II. Syntax Module SM containing correlative information or framework information Data table DT3 indicating the clause connection and the degree of connection and containing the following:

A. Relative clause for restrictive use such as which, conj.+which, that, where, when, etc.;

B. Participial construction

C. Correlative pair

Pair of a precedent adverb and a correlative subordinating conjunction;

Correlative conjunctive adverb; and

Correlative pair of subordinating conjunctions; such as partly . . . partly, partly because . . . partly because, sometimes . . . sometimes, on the one hand . . . on the other hand, etc.

D. that-clause construction

E. Relative clause for continuative use such as which, conj.+which, where, when, etc.

The aforementioned items are couplers. The connection degree of the couplers is classified from level A, the strongest, to level E, the lowest. Level A indicates that two clauses are indivisibly connected and level E indicates that the clauses can be completely parsed. The intermediate levels between level A and level E are graded levels B to D. As described later, rewriting rules RR3*a*, RR3*b*, RR3*c*, RR3*d* and RR3*e* are set according to the level of connection.

The action component rule of syntax module SM is described as the rewriting rule corresponding to the degree of the connection. It is premised that the English sentence be translated following the order of description. After the sentence is divided into two sentences at the position of the coupler, the precedent sentence is first processed or translated, and the order of description is thus forced to be followed.

The basic structure of the aforementioned items of participial construction, the correlative pair and that-clause are now detailed together with the rewriting rules RR3*b*, RR3*c* and RR3*d*.

B. Participial Construction and Main Clause

By adding a subordinating conjunction to the participial clause, the dependent adverbial clause can be formed. The connection between the main clause and the dependent clause connected by the conjunction is rather strong. Therefore, by adding a dropped subject to the dependent clause without the dependent clause being parsed from the main clause, the respective morphemes of the main clause and the dependent clause connected with the subordinating conjunction can be rather easily analyzed. In addition, the conjunction provides the syntax information and the meaning of the connection like time, condition or other. Rewriting rules are provided according to the forms of the participial construction. The forms of the participial construction and the corresponding rewriting rules RR3*b* are now explained.

[A] The participial construction starting with a present participle: <Ving-, . . . >→<$Conj+the below +Vs, . . . >

[B] The participial construction starting with a preposition+Ving:
<$Conj+Ving-, . . . >→<$Conj the below Vs-, . . . >

[C] Independent participial construction subsequent the main sentence
<. . . , NP Ving-→<. . . , $conj NP Vs->

[D] Participial construction partly inserted in the main clause
<NP(S), Vp-ing-, V . . . >→<$Conj+that+Vs, NP V . . . >

In the above formulas, $Conj indicates a conjunction, and Ving, Vp and Vs indicate a present participle.

C. Correlative Pair (1) Pair of a precedent adverb and a correlative subordinating conjunction: such . . . that-clause, so . . . that-clause, so . . . as, etc.
<. . . such–that---.>→<. . . +–. Then, ---.>

(2) Pair of subordinating conjunctions: partly because–, partly because---.; Now ving, now Ving, –.; etc.
<. . . partly because–, partly because---.>→
<---. A part of the reason is that–. Another part of the reason is that ---.>

D. that-clause construction

I. Construction having that-clause as an object
<. . . V+C+that $clause. . . >→
<. . . V+C+the following matter:$Sentence. . . >

In the above formula, V is a verb, C is a complement, $clause is a clause, and $Sentence is a sentence.

II. Formal subject construction
(1) <It is $adj that $clause . . . >→
<The following matter is $adj:$Sentence> $clause= $Sentence In the above formula, $adj represents an adjective.
(2) <It is $pp that $clause>→
<The following matter is $pp:$Sentence> $clause= $Sentence In the above formula, $pp indicates a past participle.

The relative clause for restrictive use and its rewriting rule R3*a*, and the relative clause for continuative use and its rewriting rule 3*e* are now explained.

A. Limiting Relative Clause

To describe a rewriting rule of a relative pronoun clause, it must be required that the syntactic and semantic information on English relative pronoun clause is extracted and the process of conversion is formulated in which the English sentence including the relative pronoun clauses is translated to Japanese according to the extracted information. The function of the sentence including the relative clause for restrictive use is to describe an antecedent representing the semantic center, in two ways. The first description of the noun of the antecedent is general in the main clause and the second is detailed in the subordinate clause. The connection between the relative pronoun clause and the main clause is considerably strong. In English, these two clauses cannot be divided, otherwise the uniformity of syntax and meaning will be lost. Japanese has no equivalent to the English relative pronoun clause. However, the structure of the expression mentioned above can be reduced to the universal logic representing the dual description of the noun representing the semantic center of the sentence. According to the logic, the complex sentence composed of the main and the relative is divided to two simple clauses. The separated clauses may be connected with a conjunctive such as "and" indicating logical product, or a colon suggesting the specification of the antecedent in the following simple sentence, in order to form a compound sentence. In addition, an demonstrative or the like identifying the antecedent definitely is added at the beginning of the simple sentence corresponding to the relative. In short, the complex sentence is divided to two simple sentences, while syntactic and semantic information pertaining to the relative pronoun is clearly inscribed in the simple sentences. The processing mentioned above will be referred to as reduction to universal logic, hereinafter. The syntactic and semantic information can thus be reproduced completely in the translated sentences in Japanese. Through the reduction to universal logic from the English sentence to the Japanese sentence, all the information of the relative pronoun in the original sentence can be expressed in the resulting Japanese sentence.

For the aforementioned reducing conversion, the original sentence is edited and rewritten into an English sentence with a function of an intermediate language. An example of the rewriting rule of the relative pronoun clause is shown below. The left column is an original English sentence and the right column is a rewritten English sentence.

<. . . NP which VP--->→<. . . NP. The above NP+VP--->
<. . . NP1 which NP2+VP--->→<. . . NP1. NP2+VP+the above NP1--->

In the above formulas, NP denotes a noun phrase, VP denotes a verb phrase, ". . ." denotes a main clause and "---" denotes a relative clause. In the rewritten English sentence of the intermediate language shown in the aforementioned right column, the demonstrative "the above" clearly points out the antecedent "NP/NP1", thereby describing and retaining the connection information of the two sentences. When rewriting a preposition plus relative pronoun clause, the semantically equivalent conjunctive adverb is supplemented, as described later.

When the subject of the main clause is modified by the relative pronoun clause for restrictive use, the meaning is strictly restricted by the relative clause. Therefore, the relative pronoun clause is translated prior to the main clause. In Japanese, the translated relative pronoun clause must first be described. Therefore, when parsing and editing the English sentence to form the intermediate language, the relative pronoun clause must be described as the preceding sentence. Semantically, the relative pronoun clause precedes the main clause. Since the meaning structure is thus logic, the following rewriting rules can be set. Specifically, the antecedent plus relative clause is independent as a noun phrase, thereby forming the preceding sentence. Examples of the rewriting rules of the relative clause for restrictive use are now shown.

[1] Particular Rewriting Rules (1) when the subject of the main clause is modified by a relative clause:
<NP which VP2---(,) VP1 . . . >→
  <NP which VP2---: The above NP VP1 . . . >
<Noun+PP which VP2---(,) VP1 . . . >→
  <Noun+PP which VP2---: The above NP VP1 . . . >
<NP1 which NP2 VP2---(,) VP1 . . . >→
  <NP1 which NP2 VP2---: The above NP1 not VP1 . . . >
<Noun+PP which NP2 VP2---(,) VP1 . . . >→
  <Noun+PP which NP2 VP2---: The above Noun VP1 . . . >

(2) When the main clause is affirmative, and a determiner has a function of an adjective of antecedent "NP":
<. . . only/even NP which VP2--->→
  <NP which VP2---, . . . only/even the above NP.>
<Only/Even NP which VP2---VP1 . . . >→
  <NP which VP2---: Only/Even the above NP VP1 . . . >
<Only/Even NP1 which NP2 VP2---VP1 . . . >→
  <NP1 which NP2 VP2---: Only/Even the above NP1 VP1 . . . >
<NP which VP2---, VP1 . . . >→
  <NP+VP2---: The above NP+VP1 . . . >
<S+V+only/even NP which--->→
  <NP which---: S+V+only/even the above NP--->

[2] General Rewriting Rule (1) <. . . NP which VP --->→<. . . NP: This NP+VP --->
<. . . NP1 which NP2+VP --->→
  <. . . NP1: NP2+VP+the above NP1 --->
(2) <. . . Noun+PP which VP --->→
  <. . . Noun+PP: The above N+VP --->
  <. . . Noun+PP which NP+VP --->→
<. . . Noun+PP: NP+VP+the above Noun --->

In the above formulas, PP denotes a preposition phrase composed of a preposition and a noun phrase, and Noun is a noun phrase followed by no preposition phrase.

(3) <. . . Noun whose NP+VP --->→
  <. . . Noun: The NP thereof VP --->
(4) <. . . on what NP+VP>→<. . . on the following matter. NP+VP>
(5) <. . . NP1 $prep which NP2+VP --->→
  <. . . NP1: $prep the above NP1, NP2+VP --->

E. Continuative, non-restrictive, or connecting relative pronoun clause (adverbial clause): the use of the relative pronoun which, who, whose or whom can be regarded as connective.

I. Relative Pronoun (1) <. . . , QP of which --->→<. . . ; QP of them --->, in which QP is a quantitative pronoun and IP is an indefinite pronoun.

(2) <. . . , $prep which --->→<. . . ; There$, --->, in which $prep is a preposition and There$ is a conjunctive adverb. The conjunctive adverb semantically connects the two sentences, and is semantically equivalent to the preposition plus relative pronoun and the relative adverb.

(3) <. . . , NP of which --->→
  <. . . ; The NP of the above --->
(4) <. . . (,) in which case --->→
  <. . . ; In such a case, --->
(5) <. . . , whose NP --->→<. . . ; NP thereof>

The word priority module WM is now explained. The word priority module WM is generally provided with a data table DT10 relating to the adverb or adverbial phrase at the beginning of a sentence, a data table DT11 relating to the priority in the arrangement of the adverb, and a data table DT12 relating to the priority in the arrangement of the adjective. For example, the data table DT11 relating to the adverb arrangement priority includes the vocabulary data regarding the position of an inserted adverbial phrase, the word order of verb and pronoun, the word order of verb and adverbial phrase, and the like. Examples of rewriting rule RRW are as follows.

I. The inserted adverbial clause is moved to the beginning of the sentence.
<. . . , for example, --->→<For example;CR . . . , --->
<. . . , by way of example, --->→<For example; CR . . . , --->

II. The word order of the verb, the adverb or the adverbial phrase, and the preposition phrase is changed.
<. . . V+$adv+$prep --->→<. . . V+$prep ---, $adv.>, in which $adv is an adverb or an adverbial phrase, and $prep is a preposition phrase.

III. The word order of the verb, the pronoun, and the adverb is changed.<. . . V+$pro+$adv --->→<. . . V+$adv+$pro --->, in which $pro is a pronoun and $adv is an adverb.

The session layer SS is now explained. The session layer SS is a module disconnectably connected to the base layer BL. A plurality of special modules SP are prepared according to the particular tendency of the text to be translated in a specified field. The titles representing a format of the description of the specification for patent applications, "Background of The Invention, Summary of the Present Invention, Brief Description of the Drawings, Detailed Description of the preferred Embodiment, What is claimed is:", and the data table representing the paragraph structures of claims containing a preamble marking symbol and a shift phrase marking symbol are prepared and a rewriting rule is described in a module Sp1 for U.S. patent applications.

Examples of the shift phrase described in module Sp1 are "comprising:", "comprising in combination(:)", "the improvement comprising(:)", "comprising the step of(:)", "which comprises the step of(:)", and other.

Examples of the rewriting rule described in module Sp1 are as follows:
<According to one aspect of the present invention, ---.>→
  <The first aspect of the present invention is that ---.>
<According to another aspect of the present invention, ---.>→<The second aspect of the present invention is that ---.>
<According to a further aspect of the present invention, ---.>→<The third aspect of the present invention is that ---.>
<According to still another aspect of the present invention, ---.>→<The fourth aspect of the present invention is that ---.>

Processes executed in the information processor 10 are now explained.

First in the information processor 10, following the known initialization process, a text feature extraction process is executed. The text feature extraction process is a subroutine incorporated in the letter analysis module LEX, mainly for analyzing words and extracting features. The text feature extraction process is read from the letter analysis module LEX of data ROM 12b and executed by the information processor 10. The text stored in the patent publication CDROM is read by CDROM device and transferred and stored in the HD device 60, such that the information processor 10 executes the text feature extraction process, which is detailed referring to the flowchart of FIG. 3.

Figure 3:
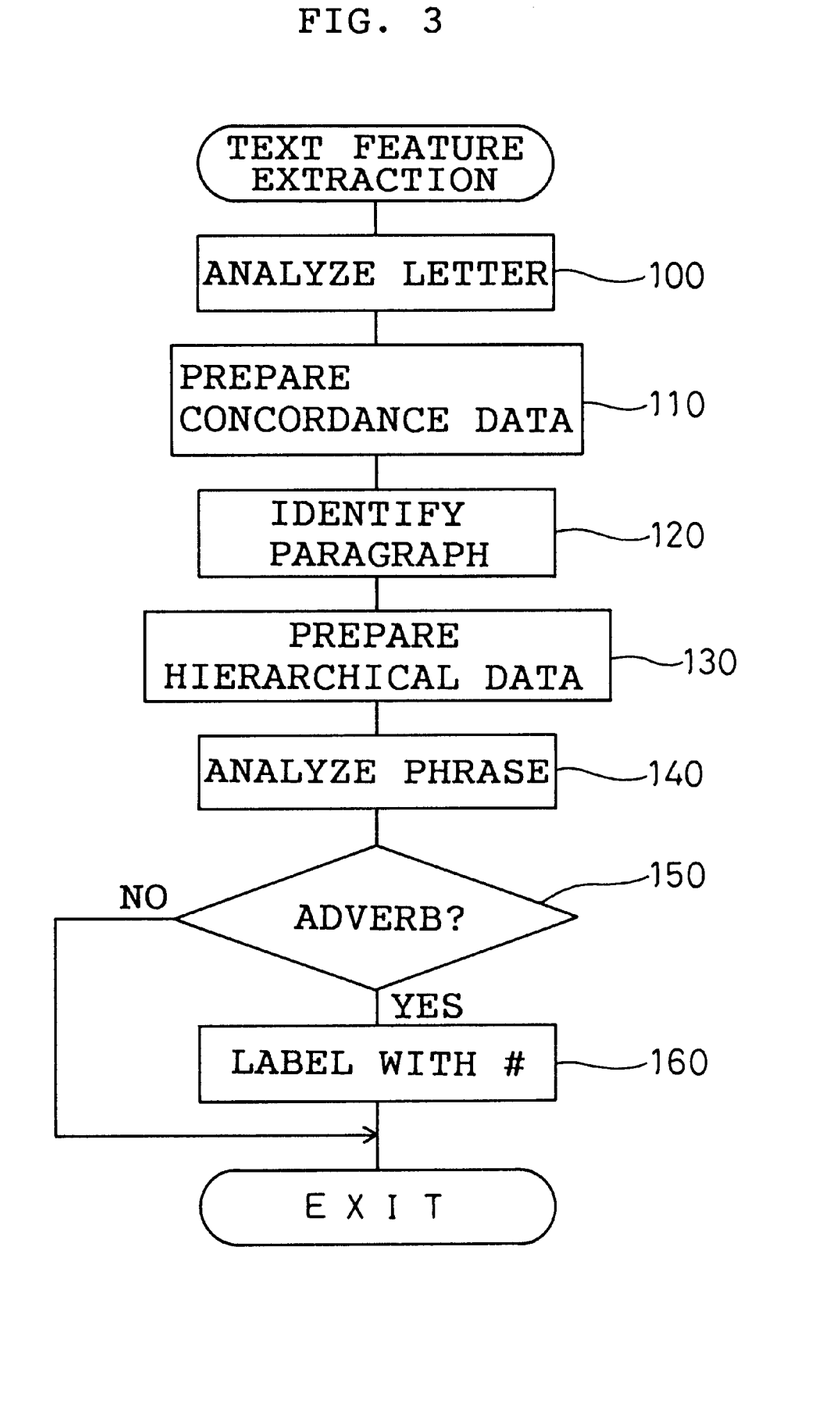
FIG. 3 is a flowchart of a text feature extraction process of the embodiment.

After the text feature extraction process starts, at step 100 the letters are analyzed, punctuation marks are identified and sentence separation is identified sequentially from the beginning of sentences of the U.S. patent publications read into the work area from the HD device 60. Through this step, all the sentences of the text are individually identified, and words and punctuation marks are taken as tokens. This analysis and identification step is a known English morpheme analysis rule, is not a main part of the present invention, and is not detailed herein.

Figure 4:
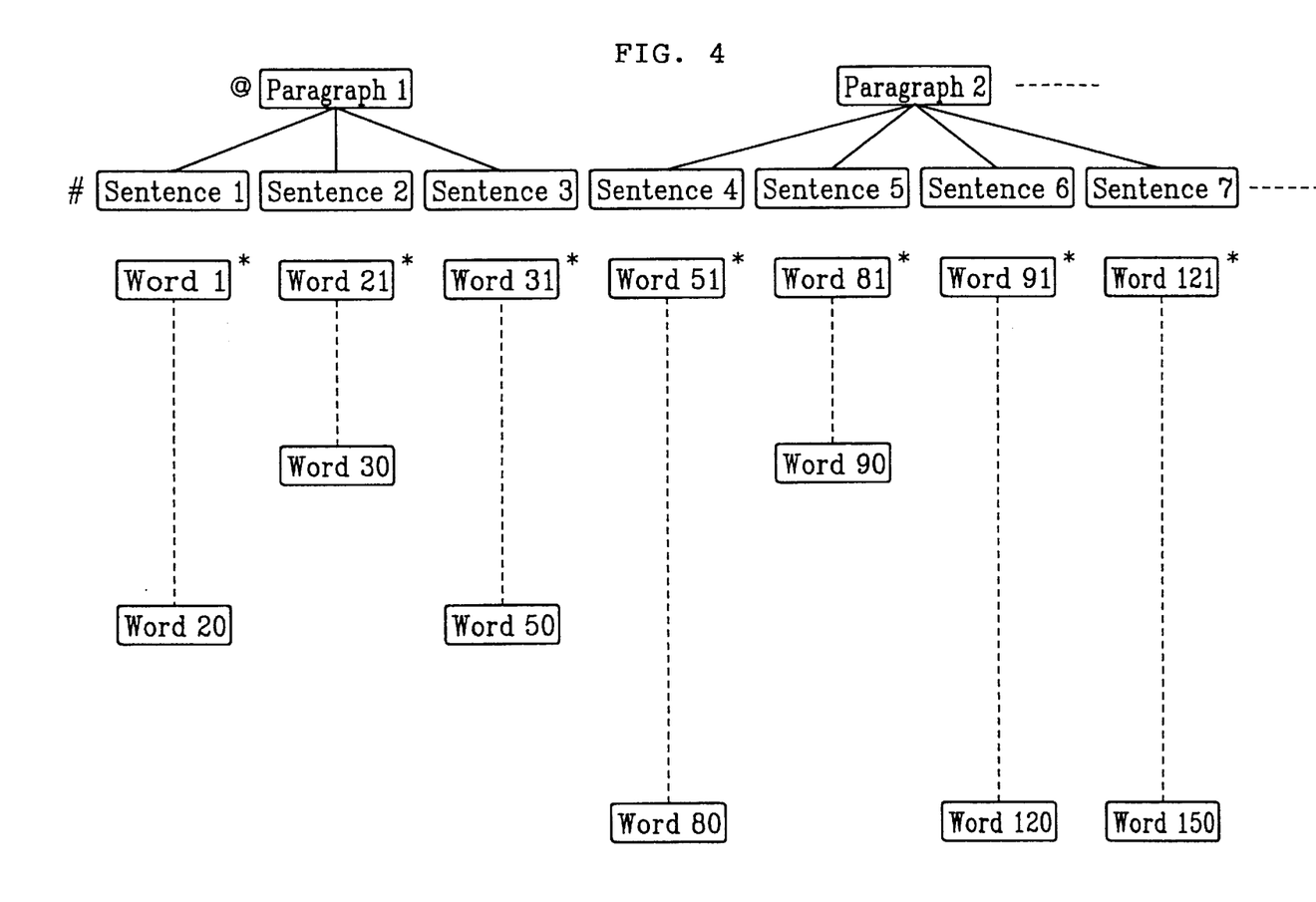
FIG. 4 is an explanatory view of a text data arrangement having a hierarchical structure.

Subsequently, at step 110, a serial number, an attribute, and the serial number of the sentence in which the word exists are allocated to each word taken from all the sentences of the text. The words with such information allocated thereto are stored in the inner area of work memory area 12a. The word existing at the beginning of the sentence is labeled with an asterisk(*) as shown in FIG. 4 and is then stored. The concordance data is thus prepared. Subsequently, at step 120 paragraphs are identified. When there is a line space code after the previous sentence and two or more space codes between the previous sentence and the present sentence, the present sentence is regarded as the sentence starting a new paragraph and is allocated with a paragraph serial number.

Subsequently, at step 130 a data table is prepared. The data table is provided with a hierarchical structure formed of the paragraph serial number, the sentence serial number and the word serial number obtained at steps 100–120 is prepared. Specifically, as shown FIG. 4, under the paragraph serial numbers dividing the text, the sentence serial numbers of all the sentences of each paragraph are arranged as the subordinate data. Under the sentence serial numbers, the word serial numbers are arranged. The paragraph serial numbers, the sentence serial numbers and the word serial numbers are hierarchically arranged in the data. At step 140, a phrase structure is analyzed only at the position of a comma. The phrase formed of the words existing between the beginning of the sentence and the first comma in the sentence is analyzed, the number of the words being a predetermined number or less. The phrase formed of the words existing between the commas in the sentence is also analyzed, as described later. At this step, only the phrase structure is precisely analyzed using the analysis tree. Subsequently, it is determined at step 150 whether or not the phrase is one of an adverb, an adverbial phrase and a prepositional phrase having an adverbial function. When the answer to step 150 is affirmative, the process goes to step 160. When the answer to step 150 is negative, the process once ends. At step 160 the serial number of the sentence determined at step 150 to have an adverb, an adverbial phrase or a prepositional phrase is labeled with a sharp(#) as shown in FIG. 4. The labeled sentence serial number is stored in the paragraph register PR provided in the data base area DA of HD device 60, thereby ending the process. The paragraph serial number data is stored as one byte data in the paragraph register PR and its most significant bit LSB is a flag indicating the existence of the label.

Through the aforementioned process, the text structure is extracted as the hierarchical data and the number of the paragraphs is detected.

Following the text feature extraction process, the relationship information extraction and text edition process is executed in the information processor 10. The relationship information extraction and text edition process is now explained referring to the flowchart of FIG. 5. In the process, the relationship information is extracted based on the relationship information model and the text is edited.

Figure 5:
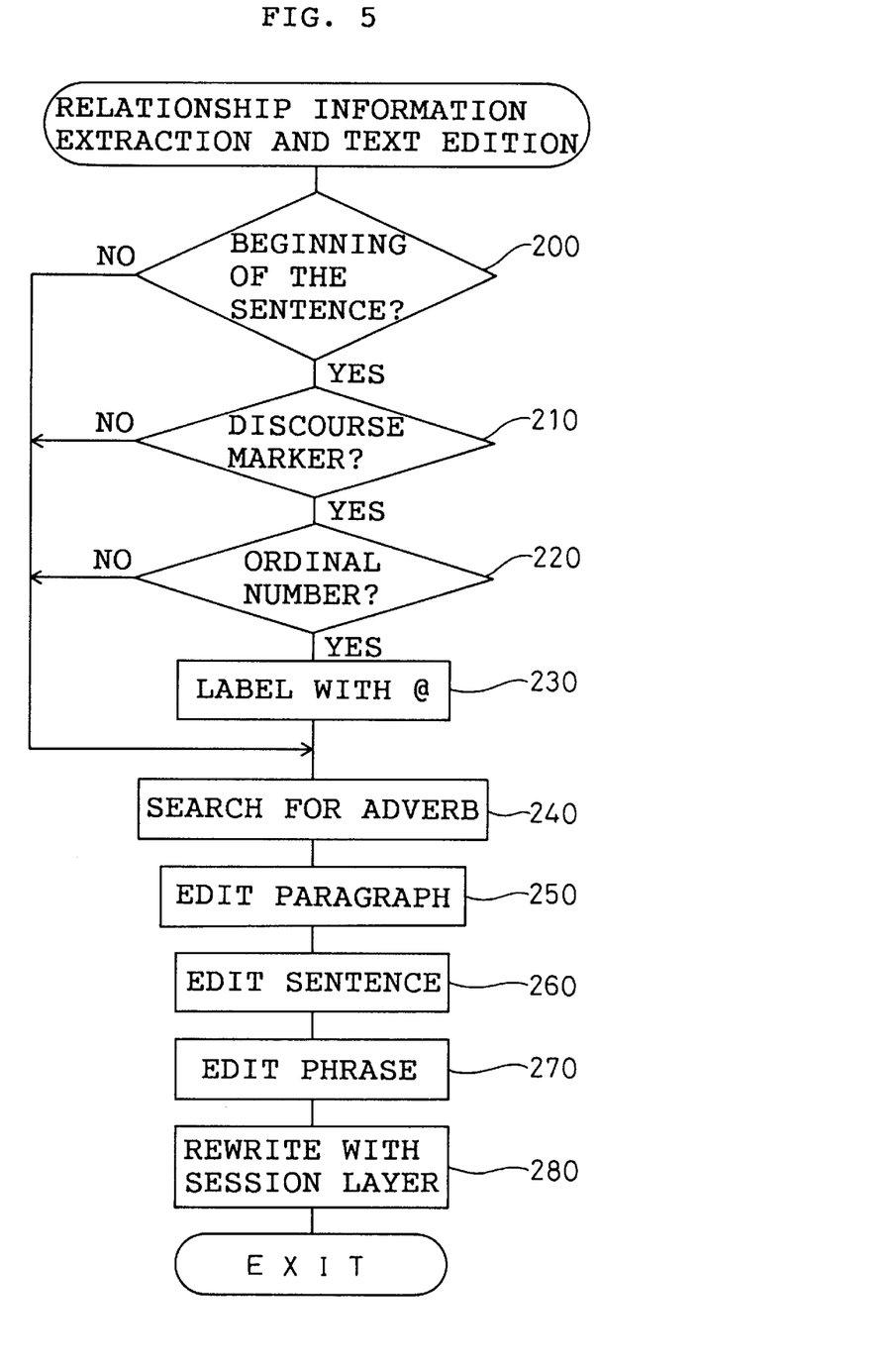
FIG. 5 is a flowchart of relationship information extraction and text edition process executed in an information process device.

After the process starts, first at step 200 it is determined whether the adverbial or prepositional phrase defined by the first comma is positioned at the beginning of the sentence, based on the results of the letter analysis in the aforementioned text feature extraction process. Specifically, it is determined whether or not the asterisk indicating the beginning of the sentence is affixed to the first word serial number in the adverbial or prepositional phrase, based on the results of the aforementioned text feature extraction process. When the answer to step 200 is affirmative, the process goes to step 210. When the answer to step 200 is negative, the process goes to step 240.

Figure 6:
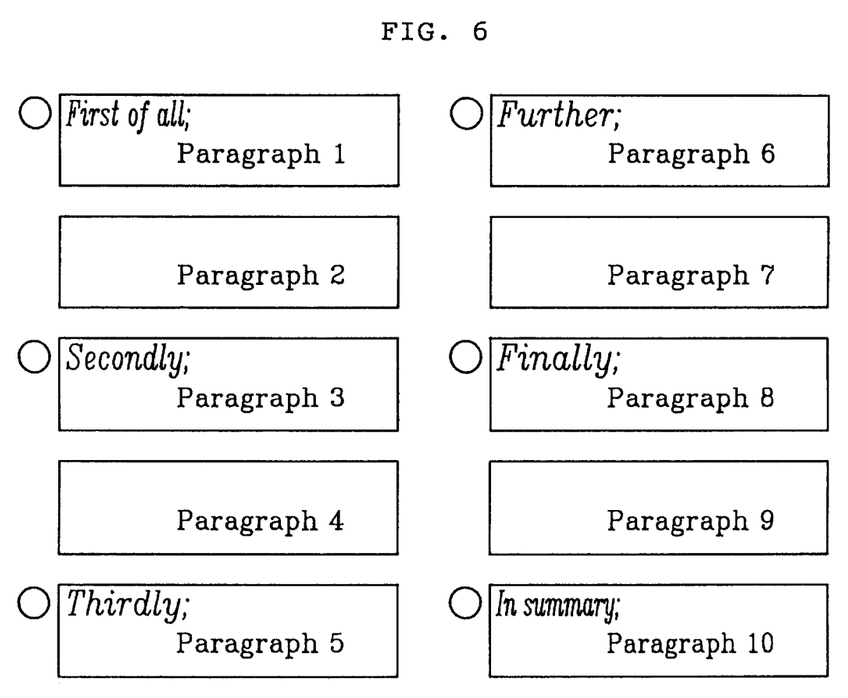
FIG. 6 is an explanatory view of a text structure.

It is determined at step 210 whether or not the adverb, adverbial phrase or prepositional phrase at the beginning of the sentence is included in the first text mark data table DT1, through pattern matching. At this step it is detected whether or not the discourse marker or any word providing the information related with the context exists at the beginning of the sentence starting the paragraph. When the answer to step 210 is affirmative, the process goes to step 220. When the answer to step 210 is negative, the process goes to step 240. When it is determined at step 220 the adverb, adverbial phrase or prepositional phrase represents an ordinal number such as "first", "firstly" or "first of all", it is also determined whether or not the beginning of the sentence starting the subsequent paragraphs is provided with the adverb, adverbial phrase or prepositional phrase being ordinal like "secondly", "thirdly". When the answer to step 220 is affirmative, the process goes to step 230. When the answer to step 220 is negative, the process goes to step 240. At step 230 the serial numbers of the paragraph and the sentence in which the second or subsequent ordinal number exists are labeled with symbol @ as shown in FIG. 4 and stored in the paragraph register PR. The word or phrase resulting from the process is translated into the Japanese equivalent having the meaning of "first", "second" through the semantic analysis process, and is arranged at the beginning of the Japanese sentence through the sentence synthesis process. At step 230, the paragraph structure of the text or discourse structure is extracted as shown in FIG. 6.

At step 240, all the sentences are searched and the sentence in which the corresponding word exists is detected, referring to the data table DT11 relating to the priority in the arrangement of adverbs. The detection result is registered together with the serial number of the sentence and the word in word array register ARR in database area DA. Subsequently, at step 250 paragraph edition process is executed. At this step, the paragraph is edited according to the rewriting rule RR1 described in the context module CM. The words of the discourse marker extracted as the paragraph information is first separated from the original sentence through the line spacing process. The separated words can be treated as an individual sentence through the syntax analysis process described later. The words of the discourse marker are semantically analyzed based on the paragraph information. These words are translated, positioned at the beginning of the translated sentence and affixed with a context indicative symbol, for example, a white or black circle, as shown in FIG. 6. Subsequently, at the sentence edition process of step 260 sentences are edited through pattern matching. Specifically, the sentence is searched for the words matching with those described in the rewriting rule patterns RR1 and RR3a–RR3e and the data tables DT1, DT2 and DT10–DT12 of context module CM and syntax module SM. The sentence including the matching words is rewritten according to the corresponding rewriting rule. For example, in case of a continuous relative clause, after conjunctive words are deleted from an original sentence, the original sentence is divided into two sentences, and a conjunctive adverb is added to the beginning of the subsequent sentence. This procedure is represented in a general formula: Clause A $conj Clause B.→Sentence A. $Adv, Sentence B., in which Clause is a clause, $conj is a conjunction, $Adv is a conjunctive adverb and Sentence is a sentence. When the original sentence is divided in sentences A and B, sentence A is translated prior to sentence B. However, the complex sentence, at the beginning of which a conjunction is positioned, is not edited and is treated as it is.

Subsequently, at the phrase edition process of step 270, the sentence registered in word array register ARR at step 240 is rewritten according to the corresponding rewriting rule RRW. First, the corresponding sentence data is read in the word area and the collated rewriting rule RRW is selected through pattern matching. The corresponding sentence is edited according to the selected rewriting rule RRW. As a result, the adverbial phrase or other inserted phrase is moved to the beginning or the end of the sentence, or the adverb or adverbial phrase embedded in a verbal phrase is moved immediately after the verbal phrase. The sentence structure is organized into one of so-called five sentence patterns. Subsequently at step 280 the sentence including the words matching with the pattern of rewriting rule RRS of session layer SS is identified. The identified sentence is rewritten based on the corresponding rewriting rule. Through the process, the difficult expressions peculiar to the U.S. patent specification is rewritten to a standard English expression carrying the equivalent information. The process once ends.

Subsequently, in the information processor 10, the text edited through the aforementioned text feature extraction process and the aforementioned relationship information extraction and text edition process is structurally and semantically analyzed. Such sentence structure analysis and semantic analysis are known as the English sentence analysis module, are not a main part of the present invention, and are not detailed herein.

Subsequently, in the information processor 10, sentence synthesis process is executed. In the process, Japanese sentences are prepared from the analysis tree resulting from the sentence structure analysis module PAR and the sentence structure analysis process, and from the Japanese words obtained from the semantic analysis module SEM and the semantic analysis process, based on the sentence synthesis module SGM.

In the embodiment, as the Japanese sentence preparing rule, a transform rule for directly transforming from the English sentence structure to the Japanese sentence structure or an ATN grammar rule of a semantic network is not used. In the embodiment, the English sentence structure is reduced to an expression metamorphosed according to the universal logic and the sentence structure is converted by selecting the Japanese sentence structure corresponding to the metamorphosed expression. Specifically, rules for translation according to reduction to universal logic is used as aforementioned in the explanation of syntax module SM. Additionally, the translation rule for translating the English sentence following the order of description is used. The sentence is not translated from behind to forward. For example, the sentence of the text edited through the relationship information extraction and text edition process is divided at the conjunctive. Therefore, the preceding sentence or the preceding clause before edition is forced to be first translated or processed, and the subsequent sentence or the subsequent clause before edition is later translated or processed. The translation is executed following the order of the description of the original sentence. Therefore, the Japanese translated sentences are prepared according to the order of the description of the original text. The original subsequent clause never precedes the original preceding clause in the Japanese sentence. The English sentence is never translated following the order reverse to the order of the description into the Japanese sentence. For the details of the structure reducing conversion, refer to "Parsing Japanese Clause Modifying Nominals" authored by Hajime NARITA in the report of Natural Language Research under Information Processing Society of Japan in 1994, Vol.94, No.9 and "Machine Translation" authored Hajime NARITA and published by Babel Co. in 1994.

As aforementioned, in the embodiment, the relationship information is extracted from the text based on the context module, the syntax module and word priority module. The original text is rewritten based on the rewriting rule collated with the extracted relationship information. The sentences, clauses and words of the text are simplified to form the sentences, clauses and words of the sentence structure including no context information or syntax information. At the same time, the edited sentences and clauses are semantically connected based on the relationship information. While the information of the relationship with the preceding sentence or clause is retained with a conjunctive, the preceding sentence or clause and the subsequent sentence or clause are connected. In short, the sentence is parsed to the simplified structure which can be analyzed using a tree structure, and at the same time the relationship information is retained using a predetermined expression. Furthermore, by dividing and editing the original sentence at the point of a conjunctive, the Japanese sentence is prepared following the same description order of the original text.

Consequently, the full syntax/semantic information and the full connection information of the original text can be retained or reflected in the translated sentences. The volume of the information of the translated sentences is equivalent to that of the original sentences. At the same time, the precision in the translated sentences can be enhanced. Since the Japanese sentence is prepared according to the description order of the original text sentences, the semantic stream of the Japanese sentences is in accord with that of the original text sentences. Consequently, natural Japanese sentences can be prepared, the translated sentences can be easily compared to the original sentences, and labor in checking or readproofing the translated sentences can be decreased.

Furthermore, in the syntax module SM, the rewriting rules RR3a, RR3b, RR3c, RR3d and RR3e are set according to the gradations of connection degree. Since the individual sentences of the original text are edited based on these rewriting rules RR3a–RR3e, the information regarding the connection between the main clause and the dependent clause in the original sentences can be reproduced in the translated sentences.

Since the text is edited with the relationship information retained, the problem that the full relationship information of the original text is conventionally lost can be overcome. The edited English sentences are analyzed using the analysis tree. The tree structure analysis can still be effective. In the invention, the application method and applicable range of the analysis tree can be formulated for the first time.

According to the present invention, the conventionally difficult sentence can be machine translated. The precision in translation is enhanced.

Furthermore, in the present invention, the edition of the original text is mechanized, thereby eliminating the man-hours required for such edition. The problems of the conventional edition system can thus be solved.

As aforementioned, in the present invention, the relationship information is extracted from the original text, and the original text is rewritten and edited based on the relationship information. The original text is rewritten according to the rewriting rule corresponding to the relationship information. For example, the sentences, clauses and words of the original text is simplified into the sentences, clauses and words of the sentence structure including no context information or no syntax information. Concurrently, the edited sentences or clauses can be semantically connected based on the relationship information.

Even after the syntax analysis is made using the analysis tree, the relationship information of the original text can be retained. Therefore, the relationship information of the original text is reflected in the translated sentences. The precision in translation is thus increased. Since the sentence structure is reduced to a simple sentence structure which can be syntax-analyzed using the analysis tree and the relationship information is retained using the predetermined expression, by limiting the applicable range of the syntax analysis, the syntax analysis can still be effective. The syntax analysis conventionally decreased precision in translation, which problem is overcome by the present invention.

In the present invention, the sentences are edited according to the connection degree of the conjunctives detected from the original text sentences. Therefore, the information regarding the connection between the main clause and the dependent claims in the original sentence can be reproduced in the translate sentence.

Further in the present invention, after the conjunctive is detected from the original text sentence, the conjunctive is deleted from the sentence. The sentence is edited by dividing the sentence into a preceding sentence and a subsequent sentence, and adding the word for semantically connecting these sentences to the subsequent sentence. Following the description order of the edited sentence, the translated sentence is prepared. The description order of the translated sentence coincides with that of the original text sentence.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A translation machine for converting an inputted original text into a target language and outputting translated sentences, comprising:

a model memory means provided with a context module, a syntax module and a word priority module for storing a relationship information model typically representing an organic structure of the original text;

a context information extraction means for reading the context module of said relationship information model from said model memory means, and collating the context module with the original text, thereby extracting a context information corresponding to a text mark described in said context module from said original text;

a link information extraction means for reading the syntax module of said relationship information model from said model memory means and collating the syntax module with said original text, thereby extracting a link information corresponding to a link mark described in said syntax module from said original text;

a word priority extraction means for reading the word priority module of said relationship information model from said model memory means and collating the word priority module with the original text, thereby extracting a word priority information corresponding to a word priority mark described in said word priority module from said original text;

a rewriting rule memory means for storing a rule of rewriting sentences and words based on the context module, the syntax module and the word priority module of said relationship information model;

a text edition means for editing said original text by rewriting said original text according to the rule stored in said rewriting rule memory means corresponding to the context information extracted by said context information extraction means, the link information extracted by said link information extraction means and the word priority information extracted by said priority information extraction means;

a translating means for translating the edited text into a target language according to a describing sentence of the edited text; and an output means for outputting a translated sentence.

2. A translation machine as claimed in claim 1, wherein after said link information extraction means reads the syntax module of the relationship information model from said model memory means and collating the syntax module with said original text, thereby detecting a conjunctive corresponding to the link mark described in said syntax module, from a sentence in the original text, said text edition means edits the sentence based on the rule stored in said rewriting rule memory, by deleting the detected conjunctive from said sentence, dividing said sentence into a preceding sentence and a subsequent sentence, and adding a word for semantically relating these two sentences to the subsequent sentence.

3. A translation machine as claimed in claim 1, wherein after said link information extraction means reads the syntax module of the relationship information model from said model memory means and collates the syntax module with the original text, thereby detecting a conjunctive corresponding to the link mark described in said syntax module, from a sentence in the original text, said text edition means edits said sentence based on the rule stored in said rewriting rule memory, corresponding to the degree of the connection of the conjunctive.

* * * * *